United States Patent Office 2,797,245
Patented June 25, 1957

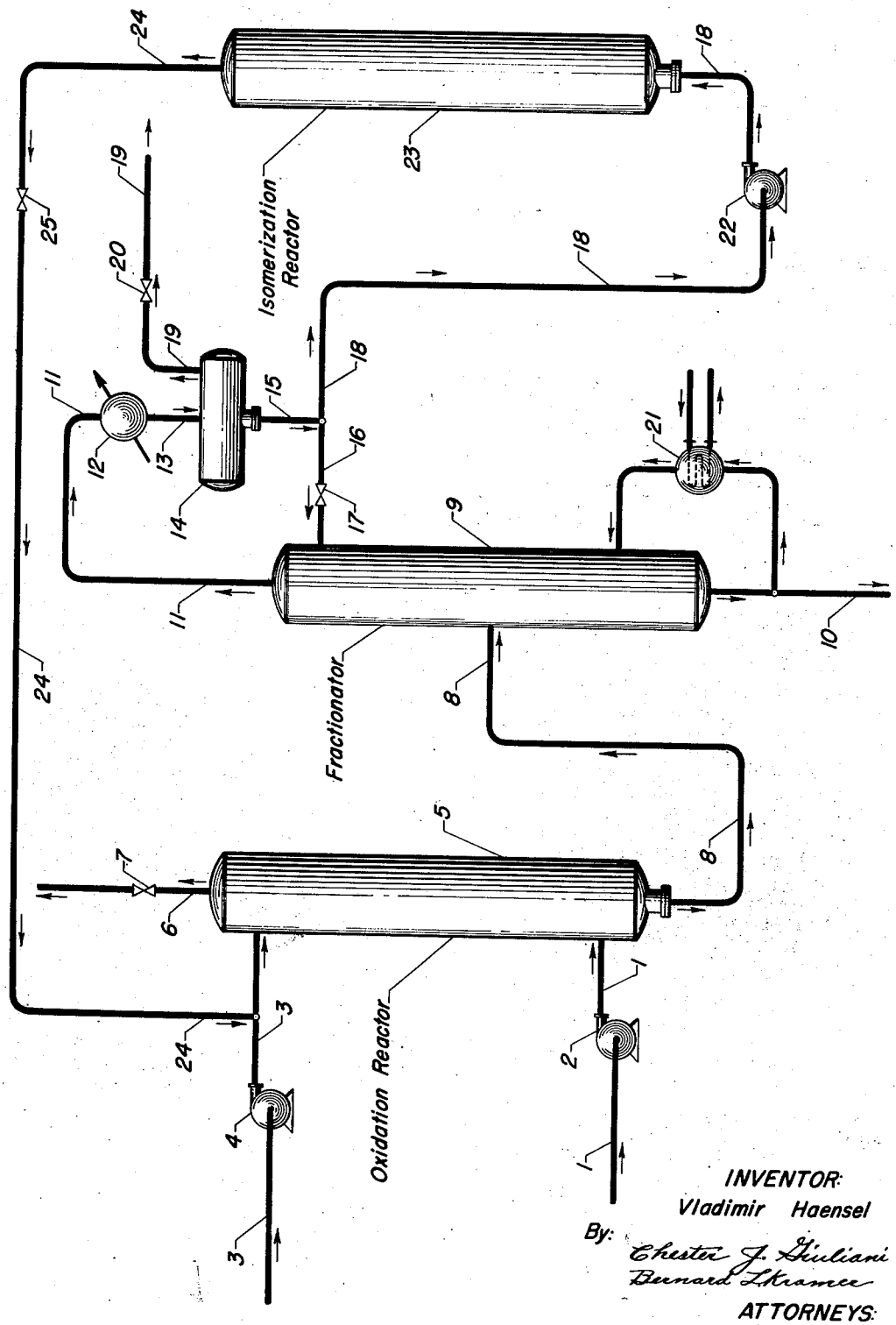

2,797,245

PRODUCTION OF ACETOPHENONE

Vladimir Haensel, Hinsdale, Ill., assignor to Universal Oil Products Company, Des Plaines, Ill., a corporation of Delaware Application March 6, 1953, Serial No. 340,823

12 Claims. (Cl. 260—592)

This invention relates to a method of producing acetophenone from mixtures containing ethylbenzene, and more particularly relates to a method of producing and recovering substantially pure acetophenone from mixtures of aromatic hydrocarbons containing 8 carbon atoms.

The process of this invention comprises subjecting a mixture of $C_8$ aromatic isomers to a controlled oxidation to produce a mixture comprising substantially acetophenone and the xylene isomers, separately recovering acetophenone by distillation, and isomerizing the residual xylene isomers to produce an equilibrium mixture of ethylbenzene and xylene isomers suitable as a charge stock for the oxidation reactor.

Ethylbenzene derivatives, although seldom used per se, are valuable as starting materials in organic synthesis reactions. It is difficult to obtain pure ethylbenzene or ethylbenzene derivatives because they naturally occur in continuous mixtures with other similar compounds. Several sources of ethylbenzene are petroleum fractions, coal tar, wood tar, and other organic distillates.

Separation of a pure compound from mixtures such as petroleum is virtually impossible and certainly commercially impractical by ordinary methods such as distillation, extraction, fractional crystallization etc., because of the extremely large number of compounds present and because of the similarity of properties of consecutive compounds in the mixture. For example, a petroleum fraction containing ethylbenzene will also contain the xylene isomers, normal and isoparaffins boiling in the same range, naphthenes and small traces of olefins, nitrogen compounds, sulfur compounds, etc. The difference in boiling point between two consecutive compounds in such a mixture is usually in the range of 1° F. or less and, to further add to the difficulty, the presence of cyclic hydrocarbons in the mixture causes azeotropic mixtures to form, thereby making separation of a pure compound by distillation techniques practically impossible.

By combining several techniques of separation it is possible to separate an aromatic cut containing the desired ethylbenzene in admixture with relatively few other compounds. For example, a crude oil may be fractionated to obtain a cut which will contain ethylbenzene and its xylene isomers, as well as the paraffinic, isoparaffinic and naphthenic compounds boiling in the same range. This cut may then be solvent extracted with a suitable selective solvent to separate it into an aromatic portion and a non-aromatic portion. The aromatic portion thus obtained will contain, substantially, ethylbenzene and ortho, meta and paraxylene.

In a particularly preferred embodiment of this invention, a crude oil is fractionated to recover a fraction containing ethylbenzene and the xylene isomers as well as the naphthenes and paraffins containing 8 carbon atoms. This cut is contacted with a suitable reforming catalyst at reforming conditions thereby effecting dehydrogenation reactions to form aromatic hydrocarbons from naphthenic hydrocarbons and dehydrocyclization reactions to form aromatic hydrocarbons from paraffinic and isoparaffinic hydrocarbons. As a result of the reforming treatment the aromatic content of the product may be as much as 700% or more of that of the original stock. The aforementioned reforming reactions may be effected by contacting the hydrocarbon fraction with a catalyst comprised of alumina containing combined halogen composited with small percentages of platinum at a temperature of from about 350° C. to about 550° C. and in the presence of hydrogen under a pressure of from about 300 p. s. i. to about 1000 p. s. i. or more. The aromatic-rich reformate thus obtained is solvent extracted to separate an aromatic portion from a nonaromatic portion.

The aromatic portion recovered from the solvent extraction process is a suitable charge stock for the present process. This aromatic extract will contain ethylbenzene and the xylenes in equilibrium proportions. Equilibrium proportions for mixtures of ortho, meta and para xylene and ethylbenzene are roughly 20:45:20:15 volume percent respectively.

In one embodiment this invention relates to a process which comprises subjecting a mixture of $C_8$ aromatic hydrocarbons to a controlled selective oxidation whereby the ethylbenzene contained in the mixture is oxidized to acetophenone, while the other $C_8$ aromatic hydrocarbons of the mixture are substantially unoxidized, fractionally distilling the resultant product to recover an acetophenone fraction and a xylene fraction, isomerizing the xylene fraction to form a substantially equilibrium mixture of $C_8$ aromatic hydrocarbons, and recycling the reformed mixture to the aforementioned oxidation.

In a more specific embodiment the present invention relates to a process which comprises contacting a mixture of ethylbenzene and xylene isomers, in the liquid phase, with oxygen-containing gas at a temperature of from about 20° C. to about 150° C. and at a space velocity regulated to limit the oxidation reaction effected therein to that of oxidizing the ethylbenzene to acetophenone, passing the effluent from the oxidation reaction zone to a fractionation zone wherein the product is separated to recover an acetophenone fraction and a mixed xylene fraction, passing the xylene fraction to an isomerization reaction zone wherein the mixed xylene fraction is contacted with an isomerizing catalyst at isomerizing conditions whereby a substantially equilibrium mixture of $C_8$ aromatic hydrocarbons is produced, and utilizing the same as charge stock for the aforementioned oxidation reaction.

Alkylaromatic compounds may be oxidized to a limited degree so that oxygen is attached to the alkyl portion of the molecule. By using a selective catalyst and controlled reaction conditions, the oxidation reactions may be regulated so as to oxidize the various compounds to greater or lesser degrees or to oxidize just one or some of the compounds but not all of them. In accordance with this invention the oxidation conditions are such so as to oxidize substantially only the ethylbenzene portion of the aromatic mixture. It has been established that ethylbenzene is the most readily oxidized compound of the $C_8$ aromatic isomers. The oxidation reaction may be effected at temperatures as low as room temperature or as high as the stability of the compounds will permit. Since acetophenone is unstable at temperatures in excess of 150° C., and since it is the desired product of this invention, the temperature of the oxidation reaction zone is limited to 150° C.

The rate at which the reaction proceeds may be regulated by the temperature in the reaction zone, the contact time of the reactants and catalyst, and the concentration of the reactants. It may be seen that suitable oxygen-containing gases, such as air, may be enriched with oxygen or diluted with inert gases such as nitrogen, carbon dioxide, flue gas or the like to regulate the reaction rate. The reaction rate may similarly be varied by regulating the space velocity at which the process is operated.

Suitable catalysts for promoting the oxidation reaction include metals of group IB, IIB, V, VI and VIII or compounds thereof which may be soluble in hydrocarbon or may be used per se or in an extended surface condition as when composited with a carrier material such as silica, alumina, silica-alumina, magnesia, bauxite, clay, diatomaceous earth, kieselguhr and the like. Cobalt and cobalt compounds have been found to be particularly suitable catalysts for effecting this oxidation reaction and cobalt stearate, which dissolves in aromatic compounds and is the preferred catalyst of this invention, has been found to be especially effective.

The oxidation reaction may be effected in either the liquid or the gas phase, however, the conditions of the reaction will usually be such that the hydrocarbons will be in the liquid phase. When the catalyst is soluble in the liquid aromatic charge stock it is generally preferred to maintain the reactants in the liquid phase to gain the advantage of better contact between the reactants and the catalyst.

The fractionation of the product from the oxidation zone may be carried out in any suitable fractionating device, preferably a standard fractionator containing means of maintaining a liquid and a gas stream in countercurrent contact with each other and provided with a reboiler in the lower portion thereof and a means for refluxing in the upper portion. The separation contemplated is not a difficult one in that the difference in boiling points between acetophenone and a xylene mixture is in the range of 65° C. The bottom stream from the fractionator will comprise acetophenone while the overhead stream will comprise mixed xylene isomers which are passed to the isomerization reactor.

The isomerization reaction may be effected by contacting the mixture of xylenes with an isomerization catalyst at a temperature of from about 150° C. to about 550° C. or higher and a pressure of from atmospheric to about 2000 p. s. i. or more.

Many suitable isomerization catalysts may be used to effect the isomerization reactions, including composites of platinum, palladium, nickel, cobalt, molybdenum, etc. or mixtures thereof with suitable supports which may include silica-alumina, silica-magnesia, silica-zirconia, silica-alumina-zirconia, alumina-fluorine, alumina-chlorine, etc. The catalyst is preferably prepared by precipitating the metal onto the surface of the support from solutions thereof. This means of preparation yields a catalyst in which the metal is in extended surface condition and intimately associated with the support.

The preferred catalyst for effecting the isomerization reactions is a composite comprising from about 0.01% to about 1.0% by weight of platinum composited with an alumina-fluorine or alumina-chlorine mixture containing from about 0.1% to about 5.0% combined halogen by weight.

The isomerization reactions are preferably but not necessarily, effected in the presence of hydrogen gas.

The effluent from the isomerization zone will comprise a substantially equilibrium mixture of C8 aromatic hydrocarbons.

The process of this invention may be better explained with reference to the accompanying drawing which illustrates diagrammatically one embodiment of the present invention, but is in no way intended to limit the invention to the particular process described.

Referring now the drawing, aromatic charge stock is passed into oxidation reactor 5 through line 3 and pump 4, a portion of the aromatic charge stock being recycled aromatic entering line 3 from line 24, the source of which shall be subsequently described. Oxygen entering the lower portion of oxidation reactor 5 through line 1 and pump 2 contacts the charge stock countercurrently causing controlled oxidation of at least a portion of the charge stock. The portion of the oxygen-containing gas that does not react with the charge stock is discharged through line 6 and valve 7, provided to maintain the proper pressure in the reaction zone, passing from the upper portion of oxidation reactor 5. Line 8 passing from the lower portion of oxidation reactor 5 carries the effluent from the the reaction zone to an intermediate portion of fractionator 9. In fractionator 9 the product from oxidation reactor 5 is separated into an acetophenone fraction which passes from the lower portion of fractionator 9 through line 10, and a xylene fraction which passes from the upper portion of fractionator 9 through line 11. Fractionator 9 is provided with a reboiler 21 to provide heat to the lower portion thereof. Overhead line 11 passes into condenser 12 wherein the overhead product is liquefied and passed through line 13 and receiver 14. Receiver 14 is provided with vent line 19 containing valve 20 to vent uncondensable gases from receiver 14. Receiver 14 is further provided with line 15 passing from the lower section thereof which carries the liquid stream from receiver 14. At least a portion of the xylene stream in line 15 passes through line 16 containing valve 17 and into the upper portion of fractionator 9 as a reflux stream to improve the separation effected in fractionator 9. The remainder of the xylene stream from line 15 passes through line 18 and pump 22 and into the lower portion of isomerization reactor 23 wherein the isomerization reactions hereinbefore described are effected. The effluent from isomerization reaction 23, which is substantially an equilibrium mixture of C8 hydrocarbons, passes from the upper portion of isomerization reactor 23 through line 24 and valve 25 and into line 3 as oxidation reactor charge stock.

It is, of course, understood that many modifications of the process as hereinbefore described may be made without removing it from the broad scope of this invention. Some such modifications may be to vary the arrangement of pumps and valves to be consistant with pressure levels maintained at various portions of the plant. For example, when it is desired to operate fractionator 9 at a higher pressure than isomerization reactor 23, pump 22 may be replaced with a valve. Similarly other flow control means, not shown, may be incorporated into the flow of the plant such as valves or pumps in line 8 to control the flow of oxidized product to the fractionator or line 10 to control the withdrawal rate of acetophenone from the process. Another modification may be to feed the mixed xylene stream from receiver 14 and line 18 into the upper portion of isomerization reactor 23 thereby having down flow through the reactor or to feed the mixed xylene stream into one or several intermediate points in the isomerization reactor.

In a preferred embodiment, as illustrated diagrammatically in the accompanying drawing, the oxidation reaction as well as the isomerization reactions are effected in reactors containing fixed catalyst beds. In order to lengthen catalyst life or to improve the continuity of the product, it is contemplated that these reactions may be effected in moving beds, fluidized processes, slurry processes, etc. When liquid or soluble catalysts are used, suitable liquid catalyst methods may be employed such as emulsifying the mixture of charge stock and catalyst and separating the product from the catalyst by settling, or dissolving the catalyst in the charge stock and separating the catalyst from the resultant product by cooling, dilution etc.

The acetophenone product resulting from the process of this invention may be further treated to produce other valuable aromatic materials. The acetophenone product may, for example, be hydrogenated to form its corresponding alcohol or further hydrogenated to ethylbenzene. The alcohol resulting from the hydrogenation of acetophenone may be dehydrated to form styrene, an extremely valuable starting compound for organic synthesis. Styrene may also be formed by the dehydrogenation of ethylbenzene.

I claim as my invention:

1. The process of manufacturing acetophenone which comprises contacting a mixture comprising ethylbenzene and xylene with an oxygen-containing gas and oxidizing ethylbenzene to acetophenone, distilling the resultant mixture to recover an acetophenone fraction and a xylene fraction, isomerizing the latter to form a mixture of ethylbenzene and xylene and supplying the resultant isomerized product to the aforesaid oxidizing step to produce additional acetophenone from the last-mentioned ethylbenzene.

2. The process of manufacturing acetophenone which comprises contacting a mixture comprising ethylbenzene and xylene with an oxygen-containing gas at a temperature of from about 20° C. to about 150° C. for a time regulated to limit the oxidation substantially to the formation of acetophenone, distilling the resultant mixture to recover an acetophenone fraction and a xylene fraction, contacting said xylene fraction with an isomerizing catalyst at a temperature of from about 150° C. to about 550° C. whereby a mixture of ethylbenzene and xylene is formed and supplying the isomerized mixture to the aforesaid oxidizing step to produce additional acetophenone from the last-mentioned ethylbenzene.

3. The process of claim 1 further characterized in that said contact with said oxygen-containing gas is effected in the presence of an oxidation catalyst.

4. The process of claim 1 further characterized in that said contact with said oxygen-containing gas is effected in the presence of a catalyst comprising a cobalt compound.

5. The process of claim 1 further characterized in that said contact with said oxygen-containing gas is effected in the presence of a catalyst comprising a cobalt stearate.

6. The process of claim 1 further characterized in that said isomerization is effected in the presence of an isomerization catalyst.

7. The process of claim 1 further characterized in that said isomerization is effected in the presence of a catalyst comprising platinum composited with an alumina-fluorine base.

8. The process of claim 1 further characterized in that said isomerization is effected in the presence of a catalyst comprising platinum composited with an alumina-chlorine base.

9. The process of claim 1 further characterized in that said isomerization is effected in the presence of a catalyst comprising platinum composited with a silica-alumina base.

10. The process of claim 1 further characterized in that said isomerization is effected in the presence of a catalyst comprising palladium composited with a silica-alumina base.

11. The process of claim 1 further characterized in that said isomerization is effected in the presence of a catalyst comprising nickel composited with a silica-alumina base.

12. The process of manufacturing acetophenone which comprises contacting a mixture comprising ethylbenzene and xylene with an oxygen-containing gas at a temperature of from about 20° C. to about 150° C. in the presence of a catalyst comprising cobalt stearate for a time regulated to limit the oxidation substantially to the formation of acetophenone, distilling the resultant mixture to recover an acetophenone fraction and a xylene fraction, contacting said xylene fraction with an isomerizing catalyst comprising platinum-alumina and fluorine at a temperature of from 150° C. to about 550° C. whereby a mixture of ethylbenzene and xylene is formed, passing said isomerized mixture into contact with oxygen-containing gas under the oxidizing conditions.

References Cited in the file of this patent

UNITED STATES PATENTS

| | | |
|---|---|---|
| 2,245,528 | Loder | June 10, 1941 |
| 2,302,466 | Palmer et al. | Nov. 17, 1942 |
| 2,404,591 | Naragon | July 23, 1946 |
| 2,545,870 | Baker et al. | Mar. 20, 1951 |
| 2,564,388 | Bennett et al. | Aug. 14, 1951 |
| 2,572,300 | Arnold et al. | Oct. 23, 1951 |
| 2,653,165 | Levine | Sept. 22, 1953 |